US011378476B2

(12) United States Patent
Jenkins et al.

(10) Patent No.: US 11,378,476 B2
(45) Date of Patent: Jul. 5, 2022

(54) INSTRUMENTED SPHERICAL BLAST IMPULSE RECORDING DEVICE (ISBIRD)

(71) Applicant: US Gov't as represented by Secretary of Air Force, Wright-Patterson AFB, OH (US)

(72) Inventors: Charles M. Jenkins, Ft Walton Beach, FL (US); Alain L. Beliveau, Niceville, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 365 days.

(21) Appl. No.: 16/815,376

(22) Filed: Mar. 11, 2020

(65) Prior Publication Data

US 2020/0386639 A1 Dec. 10, 2020

Related U.S. Application Data

(60) Provisional application No. 62/984,387, filed on Mar. 3, 2020, provisional application No. 62/837,003, filed on Apr. 22, 2019.

(51) Int. Cl.
*G01L 5/14* (2006.01)
*G01L 23/00* (2006.01)
(Continued)

(52) U.S. Cl.
CPC ............... *G01L 5/14* (2013.01); *G01L 23/00* (2013.01); *G01S 1/00* (2013.01); *G01S 19/14* (2013.01); *G01K 13/00* (2013.01); *G01P 15/18* (2013.01)

(58) Field of Classification Search
CPC ..... G01L 5/14; G01L 23/00; G01S 1/00; G01S 19/14; G01S 19/18; G01P 15/18; G01K 13/00
See application file for complete search history.

(56) References Cited

U.S. PATENT DOCUMENTS

| 2006/0086735 | A1* | 4/2006 | Weerth | B65D 88/04 220/88.1 |
| 2012/0239343 | A1* | 9/2012 | Borkholder | A42B 3/046 702/139 |
| 2016/0097756 | A1* | 4/2016 | Borkholder | G09B 19/00 73/35.15 |

FOREIGN PATENT DOCUMENTS

CN 102841371 * 12/2012

OTHER PUBLICATIONS

Barec, Small transmitter great potential use of beacon in potentially explosive atmosphere (Year: 2018).*
CN 102841371 English Translation (Year: 2012).*

* cited by examiner

*Primary Examiner* — Michael P Nghiem
*Assistant Examiner* — Dacthang P Ngo
(74) *Attorney, Agent, or Firm* — AFMCLO/JAZ; David E. Franklin (57) ABSTRACT

An Instrumented Spherical Blast Impulse Recording Device (ISBIRD) provides for survivable test measurement of an explosive blast impulse. The ISBIRD includes a spherical housing formed of a metal having a thickness sufficient to survive the explosive blast wave from a test weapon. A test data module of the ISBIRD includes: (i) a three-axis acceleration sensor; (ii) a memory; and (iii) a controller communicatively coupled to the three-axis acceleration sensor and the memory. The controller executes a data acquisition utility to record acceleration data in three-dimensions from (Continued)

the three-axis acceleration sensor during exposure of the spherical housing to the explosive blast wave. An internal support structure of the ISBIRD is attached inside of the spherical housing and attached to the test data module. The internal support structure centrally locates the test data module within the spherical housing during exposure to the explosive blast wave.

14 Claims, 7 Drawing Sheets

(51) Int. Cl.
     *G01S 1/00*       (2006.01)
     *G01S 19/14*     (2010.01)
     *G01K 13/00*     (2021.01)
     *G01P 15/18*     (2013.01)

INSTRUMENTED SPHERICAL BLAST IMPULSE RECORDING DEVICE (ISBIRD)

CROSS-REFERENCE TO RELATED APPLICATIONS

This application claims the benefit of priority under 35 U.S.C. § 119(e) to U.S. Provisional Application Ser. No. 62/837,003 entitled "Instrumented Spherical Blast Impulse Recording Device (ISBIRD)", filed 22 Apr. 2019, the contents of which are incorporated herein by reference in their entirety.

This application claims the benefit of priority under 35 U.S.C. § 119(e) to U.S. Provisional Application Ser. No. 62/984,387 entitled "Instrumented Spherical Blast Impulse Recording Device (ISBIRD)", filed 3 Mar. 2020, the contents of which are incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to acceleration measurement devices, and more particularly relates to acceleration measurement devices that have are survivable in an explosive blast wave environment.

2. Description of the Related Art

Explosive devices are tested to determine blast characteristics, such as by placing various targets at varying distances to be accelerated by a blast wave. More accurate empirical data regarding blast impulse is obtained by positioning impulse measurement devices, generally referred to as unconfined momentum traps (UMTs), with proximity to explosive device. Generally-known UMTs have block shape that is positioned to receive the blast impulse against a reinforced side. Physical forces exerted on the UMT are measured as acceleration.

While able to collect information related to the blast impulse, generally-known UMTs can be less than accurate or reliable in gathering test data. UMTs have limits to the magnitude of blast impulse that is survivable. Orienting the UMT relative to the direction of the blast is important in order for the UMT to survive and to collect useful data. Explosive devices can have different secondary effects, such as shrapnel and projectile that can adversely interact with the UMD during the blast. Even if correctly placed and not degraded by impacts, extracting test results from generally-known UMDs can be difficult or time consuming.

For example, the disk UMT is a circular flat metal disks 3-4 inches in diameter with a ½ to ¼ inch thickness or they can be another shaped block such as a cone or hemisphere that a shape factor is applied to in order to adjust the drag coefficient from that of a sphere. The mass and distance the UMT is thrown and the height above ground provides parameters used to calculate the total impulse applied to the UMT. An inverted ballistic pendulum (IBP) is a pivoting wall that is placed face on to the explosive charge and rotates about the hinged point at the top edge of the plate and stand, the height of the plate movement from a baseline is a measurement for total impulse. Cantilever Plates, provide a plastic deformation angle of a metal rod which in-turn provides the value to calculate the total impulse value.

All of these older methods can suffer from large measurement uncertainty from coefficients of material restitution between the particle and sensing material device based on collision elastic response and energy transmittance. Unusual drag effects do to a changing projected area of the UMT to the blast wave is also a factor. Energy losses from mechanical connections to the IBP and material anomalies in the Cantilever Plate poles also contribute to uncertainty in the impulse calculation. Also, most of these devices have an upper limit to the impulse they can take and still function, whereas the present innovation as described herein does not.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
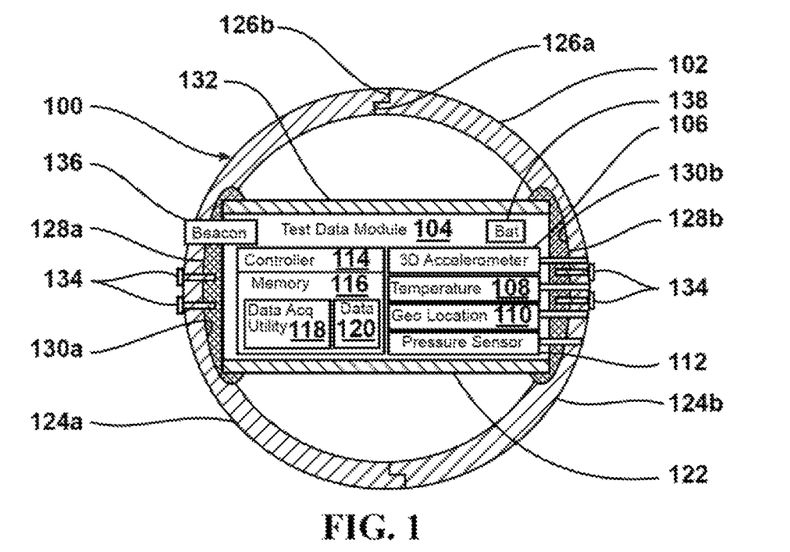
FIG. 1 illustrates a simplified block diagram of an Instrumented Spherical Blast Impulse Recording Device (IS-BIRD), according to one or more embodiments.

In one or more embodiments, FIG. 1 illustrates a simplified block diagram of Instrumented Spherical Blast Impulse Recording Device (ISBIRD) 100. Spherical housing 102 of ISBIRD 100 is formed of a metal or other strong material having a thickness sufficient to survive an explosive blast wave from a test weapon. ISBIRD 100 includes test data module 104 having one or more sensors related to explosive blast testing, such as: (i) three-axis acceleration sensor (accelerometer) 106; (ii) temperature sensor 108; (iii) geographic location sensor 110; and (iv) pressure sensor 112. Examples of geographic location sensor 110 include global positioning satellite (GPS) receiver or an automatic direction finder (ADF). Controller 114 is communicatively coupled to memory 116 and three-axis accelerometer 106, temperature sensor 108, geographic location sensor 110, and pressure sensor 112. Controller 114 executes data acquisition utility 118 to record, in memory 116, test data 120 such as acceleration data in three-dimensions, temperature, location and pressure during exposure of spherical housing 102 to an explosive blast wave. Internal support structure 122 is attached inside of spherical housing 102 and is attached to test data module 104. Internal support structure 122 centrally locates test data module 104 within spherical housing 102.

In one or more embodiments, spherical housing 102 includes first (male) and second (female) hemispherical shells 124a-b having respective first and second annular engaging surfaces 126a-b that engage when positioned together to form a sphere. Internal support structure 120 is a cylinder support assembly that includes first cap 128a received in first receptacle 130a of first hemispherical shell 124b. Internal support structure 122 also includes second cap 128b received in second receptacle 130b of second hemispherical shell 124b. Internal support structure 122 further includes open-ended cylinder 132 received and closed between first and second caps 128a-b. Fasteners 134 are attach through first hemispherical shell 124a and first cap 128a to a first end of open-ended cylinder 132. Fasteners 134 are attach through second hemispherical shell 124b and second cap 128b to a second end of open-ended cylinder 132.

In one or more embodiments, ISBIRD 100 includes beacon 136 that emits visible light, infrared light, acoustic output, or radio frequency (RF) to assist in locating ISBIRD 100. Controller 114 is communicatively is coupled to beacon 136 to activate beacon 138 in response to exposure of spherical housing 102 to the explosive blast wave. Electrical power for ISBIRD 100 is provided by replaceable or rechargeable battery 138.

Figure 2:
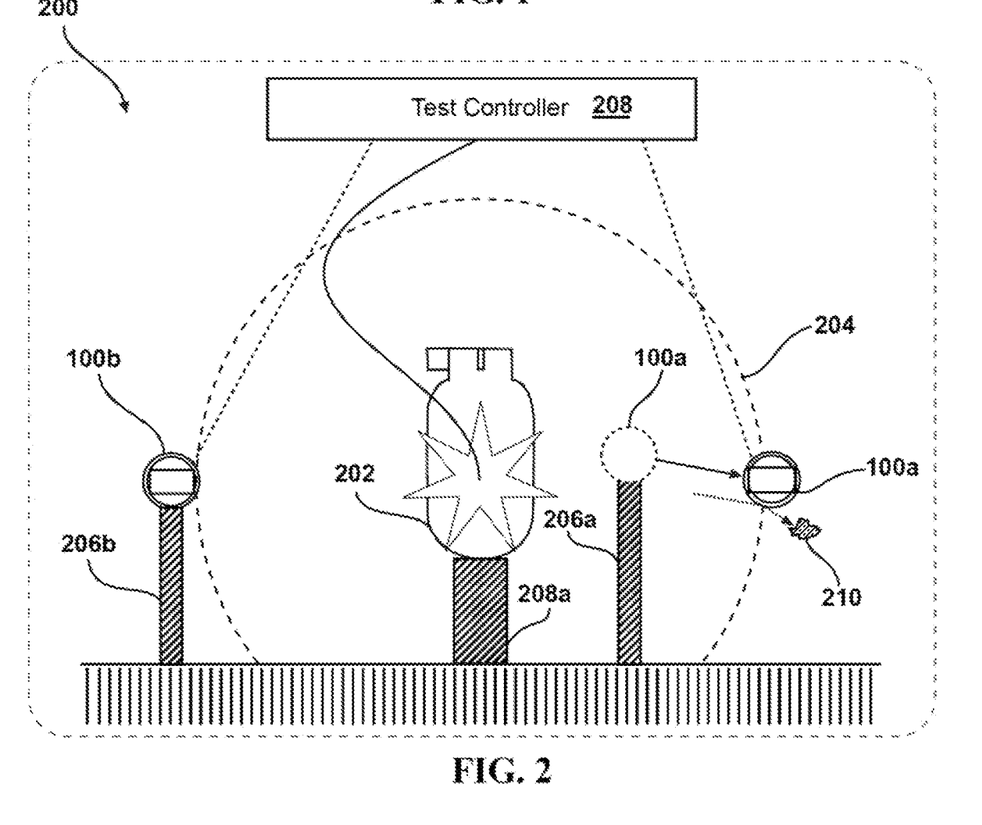
FIG. 2 illustrates a diagram of two ISBIRDs positioned in a testing scenario for an explosive device, according to one or more embodiments.

According to one or more embodiments, FIG. 2 illustrates ISBIRDs 100a-b positioned in testing scenario 200 for explosive device 202. Explosive device 202 can be a bomb, warhead, mine, missile, cannon shell or ordnance, or other assembly that includes explosive material capable of producing an explosive blast impulse or wave 204. ISBIRDs 100a-b are not sensitive to orientation with respect to explosive device 202. Pedestals 206a-c preposition ISBIRDs 100a-b and explosive device 202. For clarity, first ISBIRD 102a is shown in phantom as prepositioned closer to explosive device 202 than second ISBIRD 102b. As depicted in FIG. 1, explosive impulse 204 has thrown ISBIRD 102a to a new position (ISBIRD 102a'). At this instant, explosive impulse 204 has just encountered second ISBIRD 102b. Test controller 208 triggers detonation of explosive device 202 and wirelessly receives test data from ISBIRDs 100a-b. Test data can also be manually extracted from ISBIRDs 100a-b. The spherical shape of ISBIRDs 100a-b provides for a predictable aerodynamic response to explosive impulse 106 that is not sensitive relative rotation with respect to explosive device 202. The spherical shape also mitigates impact by shrapnel or projectiles 210 that originate from explosive device 202. Most of the spherical shape presents a tangential impact to projectile 210, which absorbs less impact and presents a stronger surface than a perpendicular impact.

The present innovation differs from previous mass block only UMTs and other instrumented shapes by using a state of the art machined reusable metallic spherical shaped container with a reusable on-board high resolution 3-axis commercially available accelerometer, additional instrumentation for temperature, pressure and position (GPS) could be added. This major improvement in a spherical shape maintains the same presented surface area to the blast wave regardless of the device's rotation or spatial orientation ensuring simplification of the applicable drag law equations and a higher breakthrough accuracy in the determination of the blast impulse and applied forces on the measurement device. The device's improvement in impulse calculation will support the accuracy needed to compare changes in experimental blast impulse measurement for variations in explosive device designs, orientation and radial distance from the explosive event. The device's measured data will provide a level of accuracy and repeatability not currently available. The present innovation ensures high quality data for validation and verification of high resolution computational models used in design and optimization of new explosives currently being developed for the Department of Defense and specifically the United States Air Force. The specific design of the device and its instrumented package could be applied by commercial industry in applications involving the measurement of fluid flows in large volume chemical reactors and mass flow transport systems (pipelines) in oil and gas refineries, fluidized bed reactors, and air/gas stripping columns. Further development is in progress to instrument the device with an accelerometer capable of 10x the data rate currently available and to adjust the specific material type of the sphere to the demands of the environment in which the device is being used. Thus the aluminum material identified in the patent could be changed depending on the corrosive environment to a composite material, stainless steel or tantalum to enhance the survivability of ISBIRD 100.

As a proof of concept, testing was conducted to compare instrumented spheres and disk-shaped UMTs. Each prototype was exposed to explosively driven blast waves to determine the effect of shape on different UMT accelerations. Based on successfully tested spherical UMTs, the present disclosure provides that is a state-of-the-art machined reusable metallic spherical shaped protective container with a reusable on-board, high-resolution 3-axis commercially available accelerometer that is resistant to high impulse loading and shock. Additional sensors for measuring temperature, pressure and local position via GPS can be accommodated. The spherical shape maintains the same presented surface area to the blast wave regardless of the rotation or spatial orientation of the spherical UMT. The continuity in response simplifies the applicable drag law equations and provides a greater accuracy in the determination of the blast impulse and applied forces on the measurement device. The device's improvement in acceleration measurement will support the accuracy needed to compare changes in experimental blast impulse for variations in explosive device designs and explosive type at different target orientation and radial distance from the explosive event.

The present innovation supports test operations for explosive testing and possibly in the commercial industry in applications involving the measurement of fluid flows in large volume unit operations such as reactors and mass flow transport systems such as oil and gas refineries, fluidized bed plug flow reactors and air/gas stripping columns. The aluminum material identified in the patent for the instrument outer shell could be changed for increased survivability in corrosive environments by using stainless steel or tantalum to enhance survivability or reduce weight by using a composite material in less corrosive environments.

The present innovation is highly responsive to the blast wave and has a capability to provide more accurate impulse measurements than an instrumented disk momentum UMT due to the same presented surface area and shape at all time during the blast event. Standard solid UMTs only provides a single impulse data point as opposed to ten (10) or more from an instrumented UMT. ISBIRD 100 enables quick analysis and graphing capability of the acceleration versus time data to determine total impulse with provided software used on any compatible laptop. ISBIRD 100 is durable and can be used multiple times with a spherical housing that can be made of different materials for different strength requirements and corrosive environments. Additionally, reset time is faster than traditional impulse measuring devices, alignment is quicker and the entire blast field can be instrumented with several of these instruments at any azimuth, height or radius for a detailed mapping of the blast field at the same time. All parts of ISBIRD 100 are serviceable or replaceable commercially.

ISBIRD 100 is designed to accurately record the acceleration of a known shape when accelerated by a blast wave generated by a high explosive detonation or by other displacing fluid bodies. By measuring the acceleration of an object of know mass and shape it is possible to then calculate the applied impulse to the sphere. ISBIRD 100 is designed to survive the extreme pressures and shock environment in near proximity of the detonation event. ISBIRD 100 records the acceleration of the sphere and saves the data until the sphere stops moving and is later down loaded to a data base such as a laptop computer where the data can then be processed into a meaningful format and displayed. ISBIRD 100 is designed to also survive a violent impact with the ground after it has been carried by the blast wave. Outer shell of ISBIRD 100 is can be metallic to resist particulate and ground impact during the event. The metallic shell is uniquely designed as a two piece shell enclosure to hole the sensor package in which the material has been machined from a solid single billet of material for increased strength and durability. In one or more embodiments, the two halves are held together along a fitted surface under compression using the accelerometer case located in the center and six machine screws on each end to pull the halves together in place along the fitted surface to form a sphere. Different materials can be used on the outer spherical shell depending on the shock, temperature, impact or corrosion resistance that is needed. The seam along the fitted surface can also be fitted with a gasket to seal the ISBIRD 100 for gas or liquid immersions.

The instrumented package contains an accelerometer, recorder and battery package, it is contained within the spherical protective shell which has been designed to withstand very high G force acceleration events and vibrations; it is a commercial off the shelf (COS) item separately produced. The instrument package electronics can be accessed via a cable system that leads to the exterior of the shell, making it possible to arm the instrument package while the item is being set on the test stand saving the onboard battery life until the test is ready to begin.

ISBIRD 100 is designed to sit on a "golf tee" like support of high density polyurethane foam or of a similar material and positioned to a height by a light structure such as wood table stand. ISBIRD 100 is deliberately launched when a blast wave strikes ISBIRD 100. Later, ISBIRD 100 is retrieved and the data down loaded. The instrumented package is then provided with a freshly charged battery sealed up in the sphere and armed when ready and placed on a new support for the next test.

The spherical case may be modified to fit the application of the specific operating environment. There are two primary reasons to choose the correct case material; durability in the operating environment and weight of the material as it relates to the expected applied forces. Durability covers the resistance to damage in the extreme environment of the blast wave and weight of the case as it applies to the size or distance of the explosive charge in order to push the invention a long enough distance to generate good usable data.

The specific design of the device and its instrumented package could be applied by to commercial industry in applications involving the measurement of fluid flows in large volume reactors and mass flow transport systems such as oil and gas refineries, fluidized bed reactors, air/gas stripping columns and other large mass flow unit operations both enclosed and in the open environment.

FIGS. 3-11 depict another example ISBIRD 500 according to aspects of the present innovation. The new design has the following attributes. (1) Smaller and lighter, will be made of steel rather than aluminum for durability; (2) ISBIRD 500 is intended for additive manufacturing that will be first printed in plastic, then in stainless steel, and later in the Air Force alloy AF9628; (3) Items are reusable, with batteries that can be removed/replaced with rechargeable lithium; (4) ISBIRD has a two axis accelerometer and a pressure sensor to record acceleration and blast pressure; (5) Standard existing test sets can be used to down load and analyze the data; and (6) Next generation ISBIRD will have Blue tooth communication and possibly temperature sensing.

Figure 3:
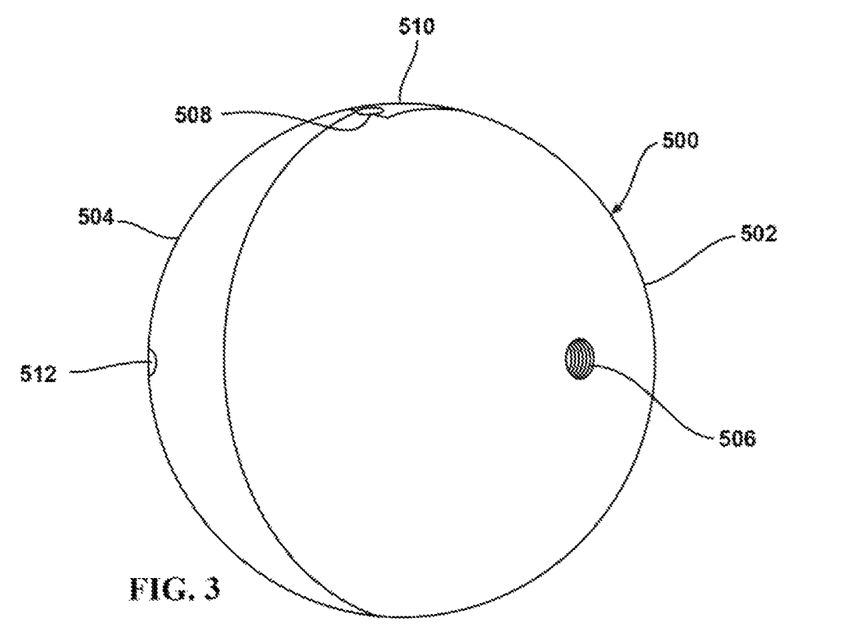
FIG. 3 illustrates a front perspective view of the ISBIRD primarily viewing a female hemisphere, according to one or more embodiments.
Figure 4:
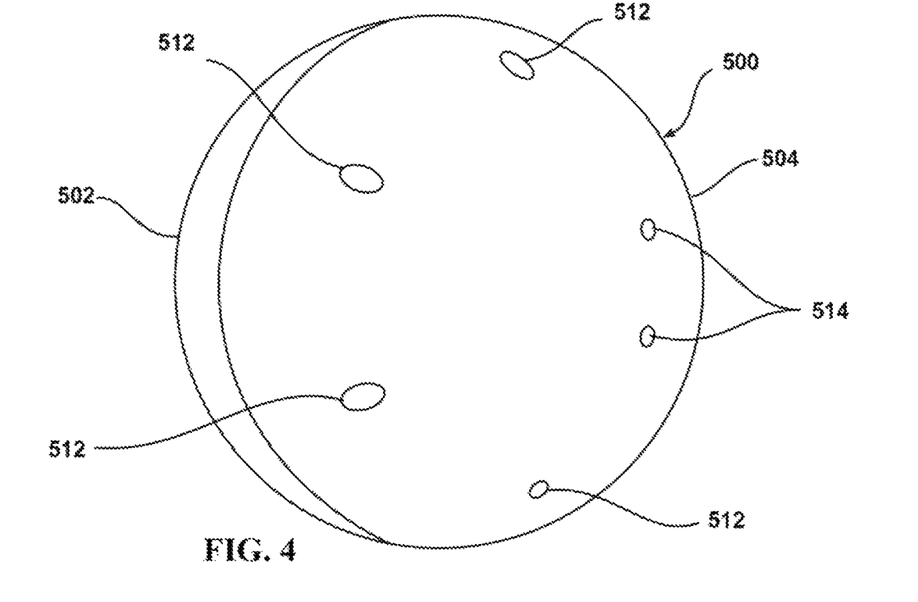
FIG. 4 illustrates a rear perspective view of the ISBIRD primarily viewing a male hemisphere, according to one or more embodiments.

FIG. 3 depicts a front perspective view of ISBIRD 500 primarily viewing female hemisphere 502. Male hemisphere 504 is attached to female hemisphere 502 that has a pressure measurement port 506. A communication port 508 (FIG. 5) at the juncture of hemispheres 502, 504 is closed by cap 510. FIG. 4 depicts a rear perspective view of ISBIRD 500 primarily viewing male hemisphere 504 that provides six (6) screw recesses 512 for attaching to female hemisphere 502. Male hemisphere 504 also includes two (2) fill ports 514. In a prototype implementation, the total weight of ISBIRD 500 is 4.15 lbs.

Figure 5:
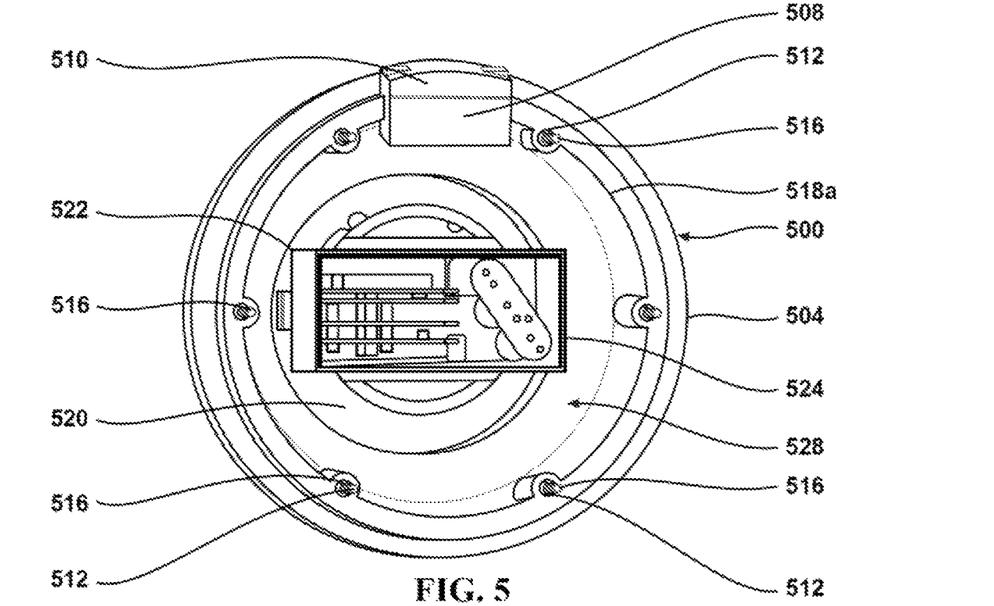
FIG. 5 illustrates an inside view of the male hemisphere of ISBIRD, according to one or more embodiments.
Figure 6:
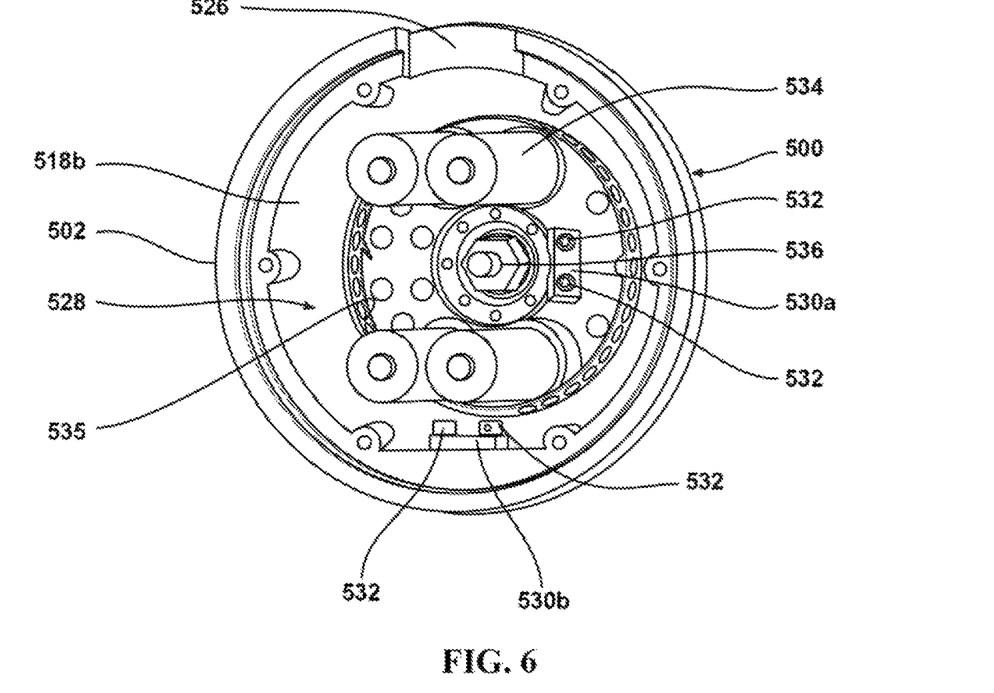
FIG. 6 illustrates an inside view of the female hemisphere of the ISBIRD, according to one or more embodiments.
Figure 7:
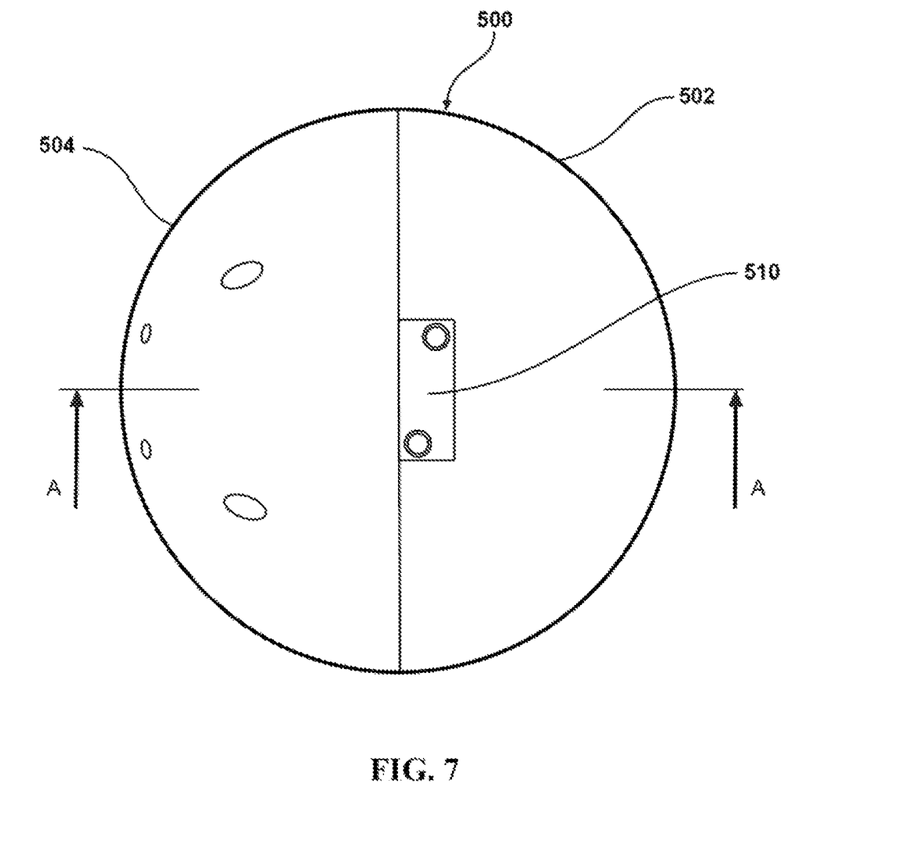
FIG. 7 illustrates a side view of a cap of the ISBIRD, according to one or more embodiments.
Figure 8:
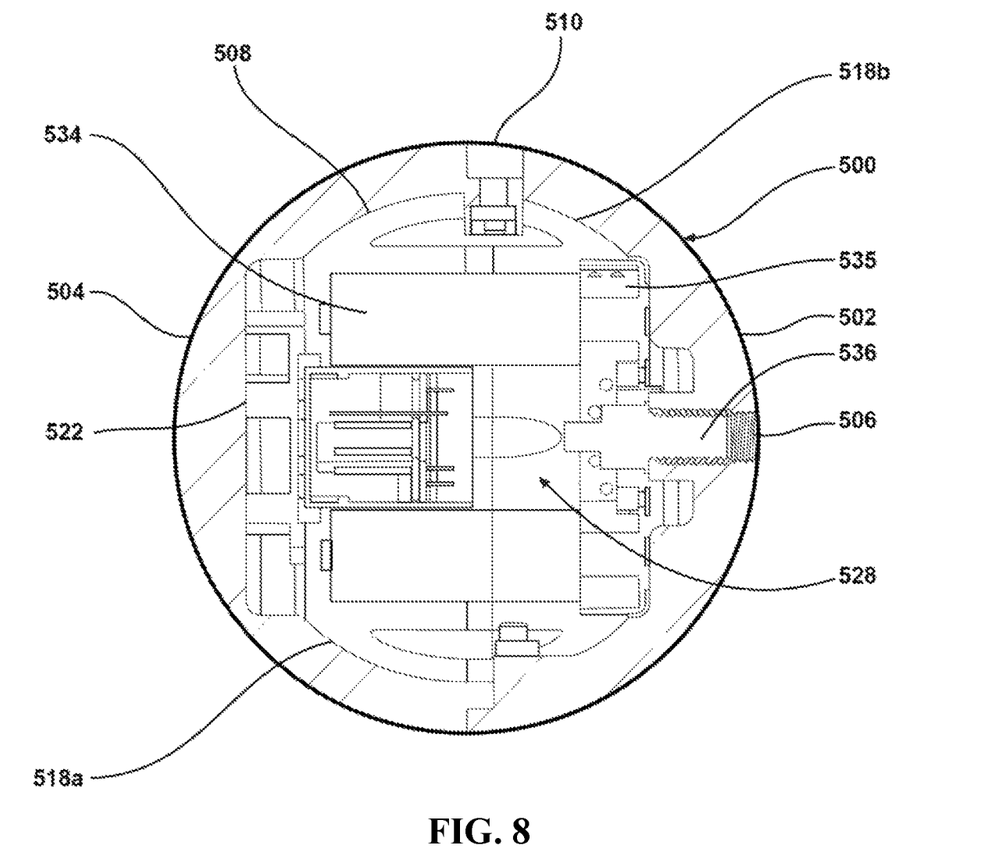
FIG. 8 illustrates a side view of the ISBIRD taken in cross section along lines A-A of FIG. 7, according to one or more embodiments.
Figure 9:
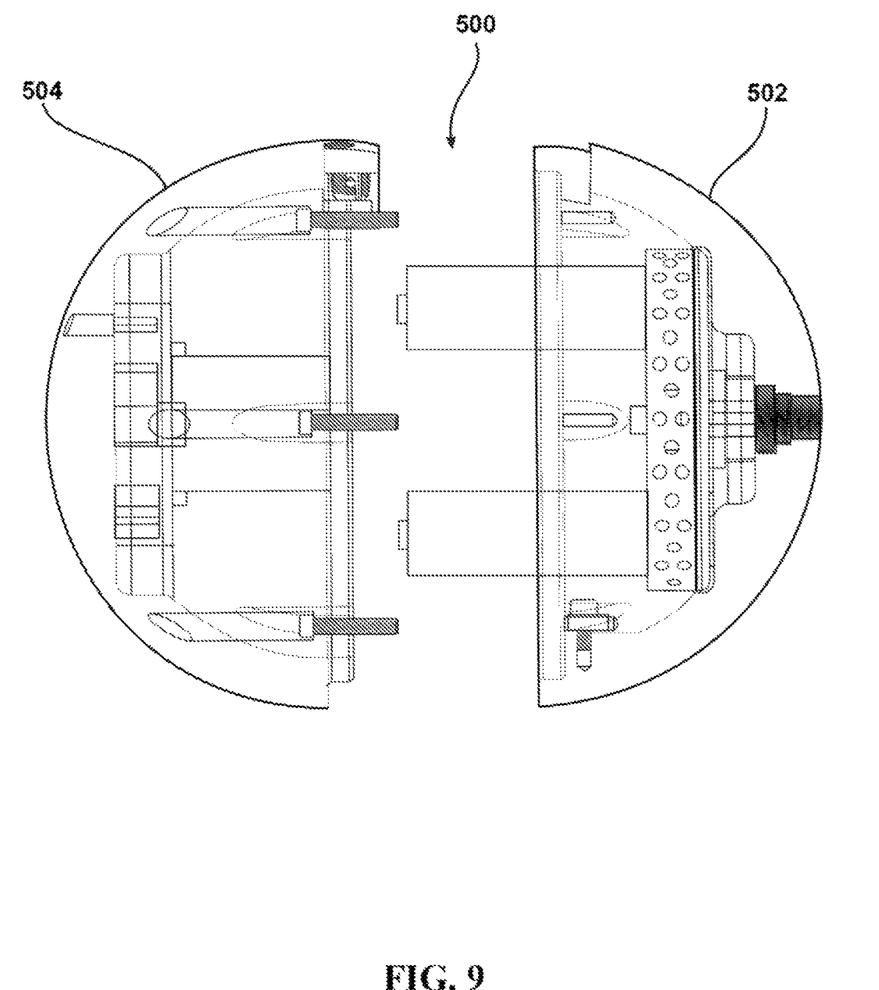
FIG. 9 illustrates a side view of the ISBIRD with the male hemisphere detached from the female hemisphere, according to one or more embodiments.
Figure 10:
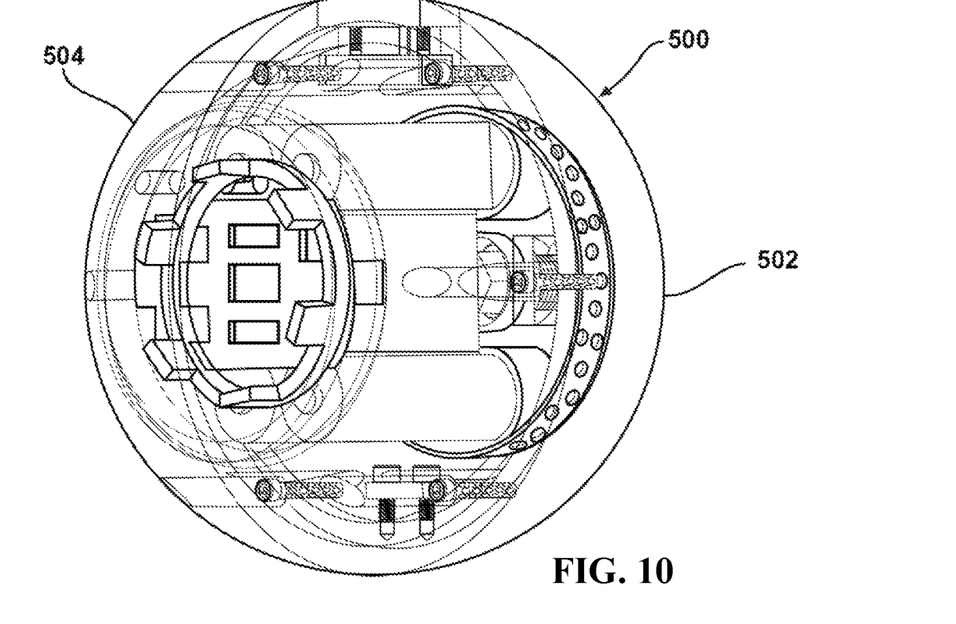
FIG. 10 illustrates a perspective view of the ISBIRD taken primarily from behind the male hemisphere that is shown in phantom, according to one or more embodiments.
Figure 11:
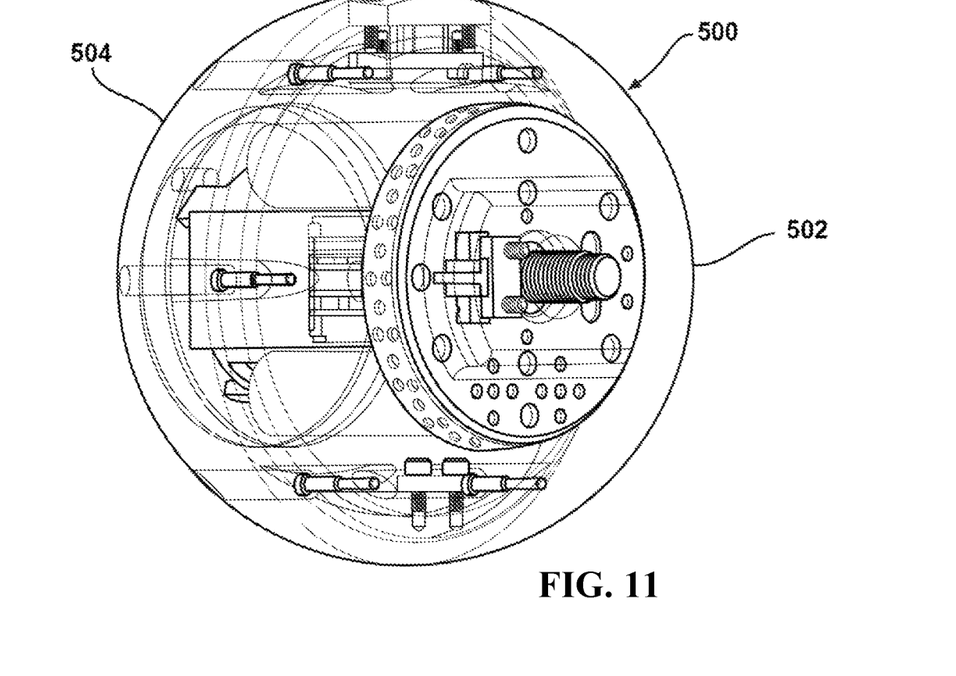
FIG. 11 illustrates a perspective view of the ISBIRD taken primarily from behind the female hemisphere that is shown in phantom, according to one or more embodiments.

FIG. 5 depicts an inside view of male hemisphere 504 of ISBIRD 500 having communication port 508 closed by cap 510. Six (6) screws 516 extend inwardly from screw recesses 512. In one embodiment, screws 516 are 4-40×⅝". Attached within a first recess 518*a* of male hemisphere 504 is a recorder 520, a combination recorder bird cage and box 522, and capacitor 524. FIG. 6 depicts an inside view of female hemisphere 502 of ISBIRD 500 having a port recess 526 for receiving communication port 508 and cap 510 (FIG. 5). Female hemisphere 502 includes a second recess 518*b* that aligns with first recess 518*a* of male hemisphere 504 (FIG. 5) to form interior cavity 528. A first accelerometer 530*a*, is orthogonal to second accelerometer 530*b*, each mounted respectively by two (2) screws 532 in second recess 518*b*. Four batteries 534 in battery birdcage 535 are positioned around pressure gage 536 that communicates with pressure measurement port 506 (FIG. 3). FIG. 7 depicts a side view of cap 510 of ISBIRD 500. FIG. 8 depicts a side view of ISBIRD 500 taken in cross section along lines A-A of FIG. 7. FIG. 9 depicts a side view of ISBIRD 500 with male hemisphere 504 detached from female hemisphere 502. FIG. 10 depicts a perspective view of ISBIRD 500 taken primarily from behind the male hemisphere 504 that is shown in phantom. FIG. 11 depicts a perspective view of ISBIRD 500 taken primarily from behind the female hemisphere 502 that is shown in phantom.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An Instrumented Spherical Blast Impulse Recording Device (ISBIRD) comprising:
    a spherical housing formed of a metal having a thickness sufficient to survive an explosive blast wave from a test weapon;
    a test data module comprising:
        a three-axis acceleration sensor;
        a memory; and
        a controller communicatively coupled to the three-axis acceleration sensor and the memory and that executes a data acquisition utility to record, in the memory, acceleration data in three-dimensions from the three-axis acceleration sensor during exposure of the spherical housing to the explosive blast wave; and
    an internal support structure attached inside of the spherical housing and attached to the test data module to centrally locate the test data module within the spherical housing during exposure to the explosive blast wave, wherein:
    the spherical housing comprises first and second hemispherical shells having respective first and second annular engaging surfaces that engage when positioned together to form a sphere; and
    the internal support structure comprising a cylinder support assembly attached between the first and second hemispherical shells.

2. The ISBIRD of claim 1, wherein the internal support structure comprises:
    a first cap received in a first receptacle of the first hemispherical shell;
    a second cap received in a second receptacle of the second hemispherical shell;
    an open-ended cylinder received between the first and second caps;
    one or more fasteners attach through the first hemispherical and the first cap to a first end of the open-ended cylinder; and
    one or more fasteners attach through the second hemispherical and the second cap to a second end of the open-ended cylinder.

3. The ISBIRD of claim 1, wherein:
the test data module comprises a pressure sensor that communicates to an exterior of the spherical housing; and
the controller communicatively is coupled to the pressure sensor and the memory and that executes the data acquisition utility to record, in the memory, pressure data from the pressure sensor during exposure of the spherical housing to the explosive blast wave.

4. The ISBIRD of claim 1, wherein:
the test data module comprises a temperature sensor that communicates to an exterior of the spherical housing; and
the controller communicatively is coupled to the temperature sensor and the memory and that executes the data acquisition utility to record, in the memory, temperature data from the temperature sensor during exposure of the spherical housing to the explosive blast wave.

5. The ISBIRD of claim 1, wherein:
the test data module comprises a geographic location sensor; and
the controller communicatively is coupled to the geographic location sensor and the memory and that executes the data acquisition utility to record, in the memory, geographic location data from the geographic location sensor during exposure of the spherical housing to the explosive blast wave.

6. The ISBIRD of claim 1, wherein:
the test data module comprises a beacon; and
the controller communicatively is coupled to the beacon and the memory and that executes the data acquisition utility to activate the beacon in response to exposure of the spherical housing to the explosive blast wave.

7. An explosive testing system comprising:
at least one an Instrumented Spherical Blast Impulse Recording Device (ISBIRD) comprising:
  a spherical housing formed of a metal having a thickness sufficient to survive an explosive blast wave from a test weapon;
  a test data module comprising:
    a three-axis acceleration sensor;
    a memory; and
    a controller communicatively coupled to the three-axis acceleration sensor and the memory and that executes a data acquisition utility to record, in the memory, acceleration data in three-dimensions from the three-axis acceleration sensor during exposure of the spherical housing to the explosive blast wave; and an internal support structure attached inside of the spherical housing and attached to the test data module to centrally locate the test data module within the spherical housing during exposure to the explosive blast wave;
at least one pedestal at a respective predefined location from an explosive device and that supports one of the at least one ISBIRD;
a test controller that triggers the explosive device to produce a blast impulse that propels each of the at least one ISBIRD from their respective at least one pedestal through the air; and
a computer that analyzes the acceleration data caused by the blast impulse and retrieved from the at least one ISBIRD.

8. The explosive testing system of claim 7, wherein:
the test data module comprises a beacon; and
the controller communicatively is coupled to the beacon and the memory and that executes the data acquisition utility to activate the beacon in response to exposure of the spherical housing to the explosive blast wave.

9. The explosive testing system of claim 7, wherein:
the spherical housing comprises first and second hemispherical shells having respective first and second annular engaging surfaces that engage when positioned together to form a sphere; and
the internal support structure comprising a cylinder support assembly attached between the first and second hemispherical shells.

10. The explosive testing system of claim 9, wherein the internal support structure comprises:
a first cap received in a first receptacle of the first hemispherical shell;
a second cap received in a second receptacle of the second hemispherical shell;
an open-ended cylinder received between the first and second caps;
one or more fasteners attach through the first hemispherical and the first cap to a first end of the open-ended cylinder; and
one or more fasteners attach through the second hemispherical and the second cap to a second end of the open-ended cylinder.

11. The explosive testing system of claim 7, wherein:
the test data module comprises a pressure sensor that communicates to an exterior of the spherical housing; and
the controller communicatively is coupled to the pressure sensor and the memory and that executes the data acquisition utility to record, in the memory, pressure data from the pressure sensor during exposure of the spherical housing to the explosive blast wave.

12. The explosive testing system of claim 7, wherein:
the test data module comprises a temperature sensor that communicates to an exterior of the spherical housing; and
the controller communicatively is coupled to the temperature sensor and the memory and that executes the data acquisition utility to record, in the memory, temperature data from the temperature sensor during exposure of the spherical housing to the explosive blast wave.

13. The explosive testing system of claim 7, wherein:
the test data module comprises a geographic location sensor; and
the controller communicatively is coupled to the geographic location sensor and the memory and that executes the data acquisition utility to record, in the memory, geographic location data from the geographic location sensor during exposure of the spherical housing to the explosive blast wave.

14. The explosive testing system of claim 1, wherein the test controller wirelessly receives test data from the at least one ISBIRD.

* * * * *